United States Patent
Bae et al.

(10) Patent No.: US 8,542,036 B2
(45) Date of Patent: Sep. 24, 2013

(54) TRANSMITTER HAVING SOURCE FOLLOWER VOLTAGE REGULATOR

(75) Inventors: Seungjun Bae, Hwaseong-si (KR); Kwangil Park, Yongin-si (KR); Youngsoo Sohn, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 13/292,244

(22) Filed: Nov. 9, 2011

(65) Prior Publication Data

US 2012/0112799 A1    May 10, 2012

(30) Foreign Application Priority Data

Nov. 10, 2010    (KR) .................. 10-2010-0111685

(51) Int. Cl.
*H03K 3/00*    (2006.01)

(52) U.S. Cl.
USPC ........................................... 327/108

(58) Field of Classification Search
None
See application file for complete search history.

(56) References Cited

U.S. PATENT DOCUMENTS

| | | | |
|---|---|---|---|
| 6,037,805 A | 3/2000 | Kuroda et al. | |
| 7,012,450 B1 * | 3/2006 | Oner et al. | 326/86 |
| 7,142,053 B2 * | 11/2006 | Phillips et al. | 330/51 |
| 7,157,959 B2 * | 1/2007 | Ball et al. | 327/427 |
| 7,342,420 B2 | 3/2008 | Isik et al. | |
| 7,764,055 B2 * | 7/2010 | Rozenblit et al. | 323/282 |
| 7,982,500 B2 * | 7/2011 | Luich | 326/81 |
| 2008/0246511 A1 | 10/2008 | Miura et al. | |

FOREIGN PATENT DOCUMENTS

KR    1020090006339    1/2009

* cited by examiner

*Primary Examiner* — Lincoln Donovan
*Assistant Examiner* — Khareem E Almo
(74) *Attorney, Agent, or Firm* — F. Chau & Associates, LLC

(57) ABSTRACT

A transmitter suitable for signal driving of a semiconductor device includes a driving power voltage generator and an output driver. The driving power voltage generator includes an NMOS transistor having a drain connected with a first voltage supply terminal, a gate connected to receive a second voltage lower than a voltage of the first voltage supply terminal, and a source outputting an output driving voltage and configured to perform source follower voltage regulating.

15 Claims, 14 Drawing Sheets

TRANSMITTER HAVING SOURCE FOLLOWER VOLTAGE REGULATOR

CROSS-REFERENCE TO RELATED APPLICATION

This application claims under 35 U.S.C §119 priority to and the benefit of Korean Patent Application No. 10-2010-0111685 filed Nov. 10, 2010, the entire content of which is incorporated by reference herein.

BACKGROUND

The present disclosure relates to transmitters suitable for a low-power semiconductor memory device, and more particularly, to an open loop source follower voltage transmitter and a driving voltage controlling method thereof.

The recent development of high-speed and low operating power semiconductor memory devices have caused the manner in which signals are transferred from a transmitter within a semiconductor memory device to be changed from high voltage swing signaling into low voltage swing signaling.

A transmitter that is generally placed within an output circuit of the semiconductor memory device may be formed by a regulator that generates a regulated driving power and an output driver that receives the driving power and transmits data to an output terminal.

A typical regulator may be formed of a common source circuit and a PMOS transistor is mainly used as a current driving element. The current driving strength of a PMOS transistor may be lower than that of an NMOS transistor, and can be significantly changed according to power supply VDD variations. For this reason, a power supply rejection ratio (PSRR) of the PMOS transistor, which is a log ratio of output noise to input noise, may be relatively inferior as compared with the PSRR of an NMOS transistor.

Accordingly, regulators have been implemented by a source follower circuit with a current driving element having an NMOS transistor. In this case, an amplifier is typically needed to provide the gate of the NMOS transistor with a gate voltage higher than a power supply voltage, and, as a result, power consumption may be increased when an operation mode is executed in a closed loop fashion.

Accordingly, a need exists for a transmitter having a low-power, simplified regulator as a driving power generator.

SUMMARY

In accordance with an exemplary embodiment of the inventive concept a transmitter is provided having a driving power voltage generator configured to perform open loop source follower voltage regulating, and includes an NMOS transistor having a drain connected with a first voltage supply terminal, a gate configured to receive a second voltage lower than a voltage of the first voltage supply terminal and higher than a sum of a threshold voltage of the NMOS transistor and an output driving voltage by a margin voltage, and a source configured to output an output driving voltage. An output driver is configured to use the output driving voltage to provide driving power for the output driver and to transfer data input at an input terminal of the output driver to an output terminal of the output driver.

In an exemplary embodiment the output terminal of the output driver may be formed as a single output terminal.

In an exemplary embodiment the output terminal of the output driver may be formed as differential output terminals.

In an exemplary embodiment a capacitor may be connected between the source of the NMOS transistor and a ground and configured to filter noise.

In an exemplary embodiment an integral filter may be connected between the first voltage supply terminal and the gate of the NMOS transistor and configured to filter noise.

In accordance with an exemplary embodiment of the inventive concept a transmitter includes a driving power voltage generator including an NMOS transistor having a drain connected with a first voltage supply terminal, a gate configured to receive a second voltage lower than a voltage of the first voltage supply terminal, and a source configured to output an output driving voltage, the driving power voltage generator configured to perform source follower voltage regulating. An output driver uses the output driving voltage as a driving power and is configured to transfer data input at an input terminal to an output terminal. An operation mode controller is connected with the driving power voltage generator. The operation mode controller is configured to control the driving power voltage generator to operate in a closed loop during a calibration mode and in an open loop during an operation mode other than the calibration mode.

In an exemplary embodiment the operation mode controller may include a first control unit configured to generate the second voltage in response to a control code obtained by calibrating the output driving voltage during the calibration mode and to control the gate of the NMOS transistor.

In an exemplary embodiment the first control unit may include a digital-to-analog converter controlled by a digital code.

In an exemplary embodiment the operation mode controller may include a second control unit connected between the drain of the NMOS transistor and the first voltage supply terminal, the second control unit configured to control a driving strength of the NMOS transistor in response to a control code obtained by calibrating the output driving voltage during the calibration mode In an exemplary embodiment an integral filter may be connected between the first voltage supply terminal and the gate of the NMOS transistor and configured to filter noise.

In an exemplary embodiment a reference voltage generator may be configured to generate a reference voltage for supplying the second voltage, and an integral filter may be connected between an output of the reference voltage generator and the gate of the NMOS transistor and configured to filter noise.

In an exemplary embodiment the second control unit may include a plurality of MOS transistors each turned on/off according to logic states of the digital code.

In an exemplary embodiment an amplifier may form a closed loop with respect to the driving power voltage generator and be configured to generate the second voltage. A switch may be configured to switch one of an output of the amplifier and an output of the digital-to-analog converter into the gate of the NMOS transistor in response to a switching control signal. A switching controller may be configured to generate the switching control signal.

In an exemplary embodiment the switching controller may be configured to control the switch during the calibration mode such that fine calibration is made after coarse calibration.

In an exemplary embodiment the amplifier may operate in a closed loop during the calibration mode and the driving power voltage generator may receive an output of the digital-to-analog converter as the second voltage to operate in an open loop.

In accordance with an exemplary embodiment of the inventive concept a voltage regulator includes a driving power voltage generator having at least one NMOS transistor, whose drain is connected to a power supply voltage, whose gate is configured to receive a gate voltage, and whose source is configured to output an output driving voltage, and an operation mode controller connected to the driving power voltage generator and configured to control the driving power voltage generator to operate in a closed loop mode during a calibration operation, and to operate in an open loop mode during an operation other than the calibration operation. In the closed loop mode a first code or a second code is generated by calibrating the output driving voltage during the calibration operation to provide a gate voltage to the gate of the at least one NMOS transistor in response to the first code or to control the driving strength of the at least one NMOS transistor in response to the second code. In the open loop mode the operation mode controller does not receive feedback from the driving power voltage generator.

In an exemplary embodiment the voltage regulator may include an output driver, driven by the output driving voltage, and configured to output input data input received by the output driver.

In an exemplary embodiment the voltage regulator may include an off-chip driver, driven by the output driving voltage, and including a pull-up driver array and a pull-down driver array that receive the output driving voltage.

In an exemplary embodiment the operation mode controller may include a first control unit connected to the gate of the at least one NMOS transistor and configured to generate a gate voltage applied to the gate in response to the first code, and/or a second control unit connected between the drain of the at least one NMOS transistor and the first power supply terminal and configured to control the driving strength of the at least one NMOS transistor in response to the second code.

In an exemplary embodiment the driving power voltage generator may include a plurality of NMOS transistors whose drains are connected a power supply voltage, whose gates commonly receive the gate voltage, and whose sources output the output driving voltage, and the second control unit may include a plurality of PMOS transistors each turned on/off according to corresponding logic states of the second code.

BRIEF DESCRIPTION OF THE DRAWINGS

The following description refers to the following figures, wherein like reference numerals refer to like parts throughout the various figures unless otherwise specified.

DETAILED DESCRIPTION

Exemplary embodiments of the inventive concept are described more fully hereinafter with reference to the accompanying drawings.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

It will be understood that when an element or layer is referred to as being "on", "connected to", "coupled to", or "adjacent to" another element or layer, it can be directly on, connected, coupled, or adjacent to the other element or layer, or intervening elements or layers may be present.

Figure 1:
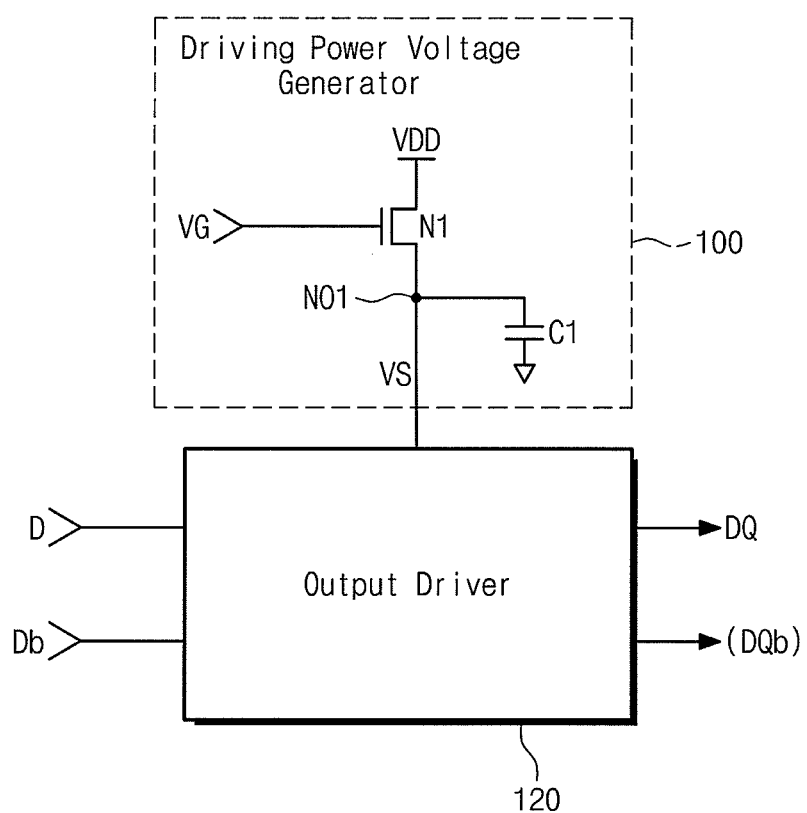
FIG. 1 is a block diagram illustrating a transmitter according to an exemplary embodiment of the inventive concept.

FIG. 1 is a block diagram illustrating a transmitter according to an exemplary embodiment of the inventive concept. Referring to FIG. 1, a transmitter may include a driving power voltage generator 100 and an output driver 120.

The driving power voltage generator 100 may include an NMOS transistor N1 which has a drain connected with a first voltage supply terminal, for example, a power supply voltage (VDD) supply terminal. The NMOS transistor N1 may receive at its gate a second voltage VG lower in level than a voltage of the VDD supply terminal and may output an output driving voltage VS at its source. The NMOS transistor N1 of the driving power voltage generator 100 may perform source follower voltage regulating in an open loop.

The output driver 120 may use the output driving voltage VS of the driving power voltage generator 100 as a driving power. The output driver 120 may transfer data D, Db that is input to input terminals of output driver 120 to output terminals DQ, DQb of the output driver 120, respectively.

In an exemplary embodiment, the voltage VG applied to the gate of the NMOS transistor N1 may be set to a voltage higher than a voltage (Vth+Vs) by a margin voltage Vmargin, voltage Vth being the threshold voltage of the NMOS transistor N1.

In an exemplary embodiment, the output driver 120 may have the output terminals formed as differential output terminals so as to output the data in a low swing differential signaling manner. However, the inventive concept is not limited thereto. For example, the output driver 120 may have the output terminal as a single output terminal.

A capacitor C1 may be further connected between the source NO1 of the NMOS transistor N1 and a ground to filter power noise.

If the driving power voltage generator 100 is formed of the NMOS transistor N1 as shown in FIG. 1 where voltage regulating is made in a source follower manner, although power supply voltage VDD can vary, an improved PSRR can be provided. The PSRR can be a parameter indicating the variation of an output voltage due to the variation of a power supply voltage, or can be used to express a ratio of the variation of an input voltage to a variation of an output voltage.

Since the current driving strength of an NMOS transistor is about three times larger than that of a PMOS transistor, an area occupied by the NMOS transistor may decrease by three times as compared with that occupied by the PMOS transistor. Further, in the event that a regulator is designed to have the same capacity, the amount of current consumed by the NMOS transistor may be relatively small.

With low swing differential signaling, since the output driving voltage VS would be about 0.2V, the gate voltage VG of about 0.8V to 0.9V would be enough to drive an NMOS transistor. Accordingly, supplying the gate with a voltage higher in level than a power supply voltage VDD is not needed, and an over-driving voltage would not be needed. Therefore, a regulating operation would become simplified.

Since the over-driving voltage is unnecessary, an amplifier such as a charge pump would not be needed. As such, circuit implementation can be simplified and overhead reduced.

Since the NMOS transistor N1 operates in an open loop, power consumption may be minimized or reduced as compared with a closed loop. That is, an operation executed with a closed loop may include measuring an output driving voltage VS during an operation of a regulating transistor, comparing the measured voltage with a target voltage, and varying a gate voltage VG according to the comparison result (i.e., a voltage difference). On the other hand, an operation mode executed with an open loop would not accompany calibration and feedback operations within the circuit.

In the configuration of the NMOS transistor N1 in FIG. 1, since an operation mode executed in open loop exits without executing an operation mode in closed loop, minimum performance may be maintained.

Figure 2A:
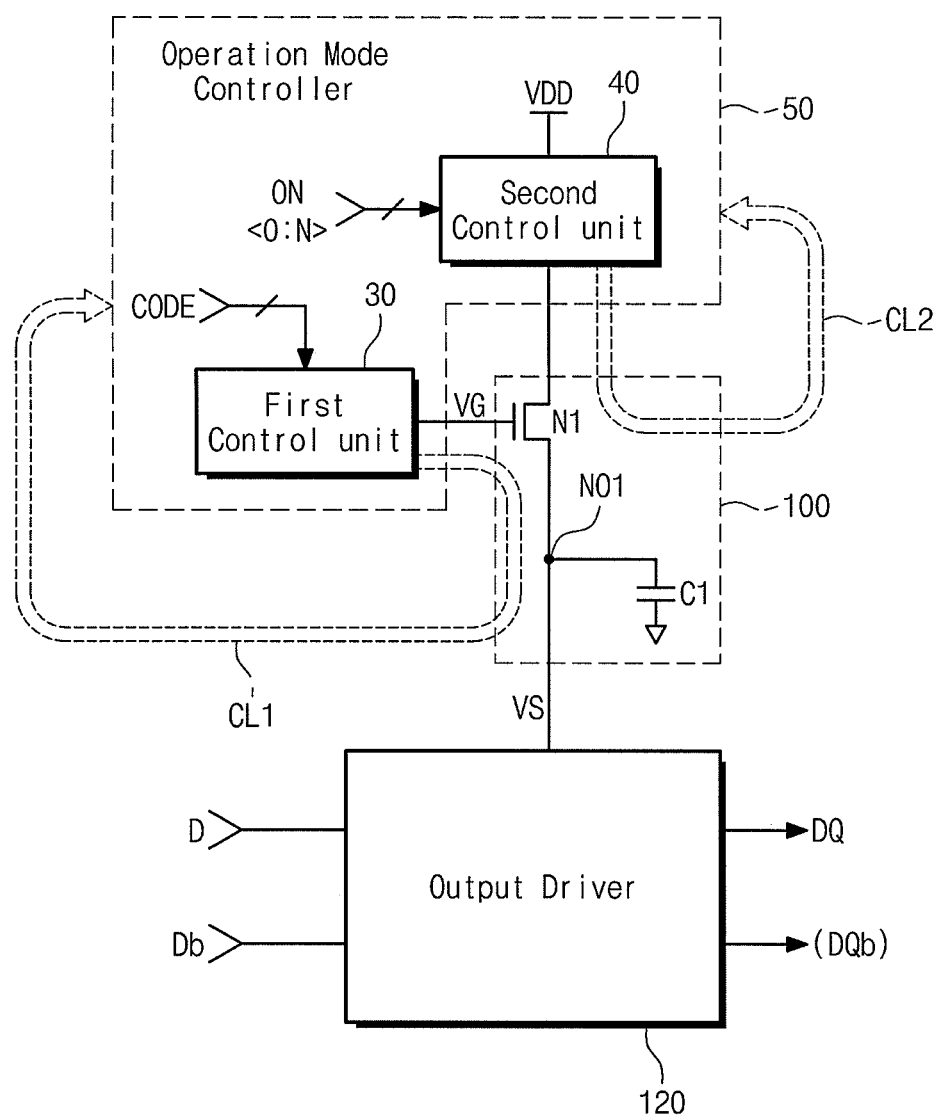
FIGS. 2A and 2B are circuit block diagrams of a transmitter in a closed loop operation mode and in an open loop operation mode, respectively, in accordance with an exemplary embodiment of the inventive concept.
Figure 2B:
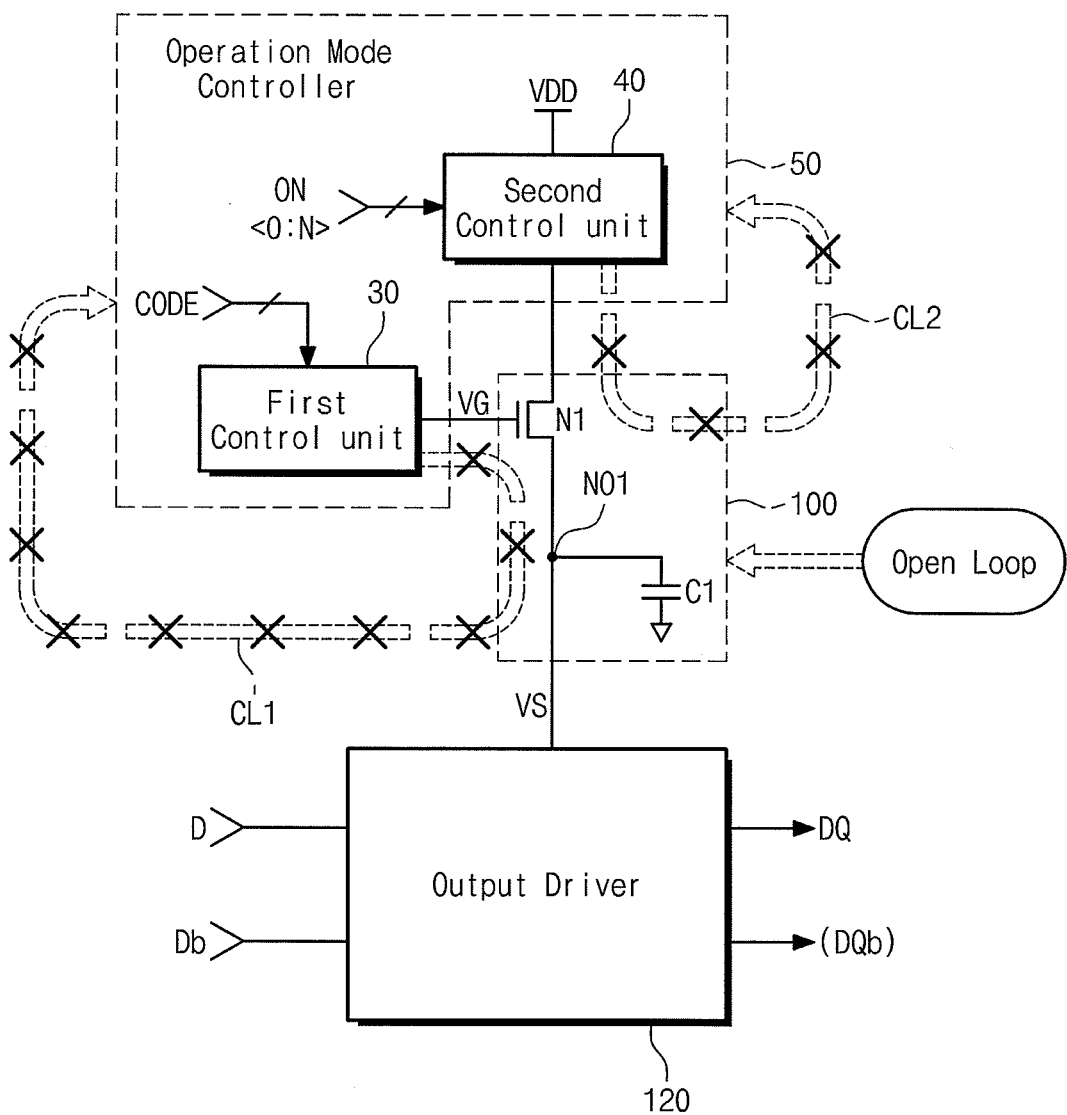

FIGS. 2A and 2B are circuit block diagrams of a transmitter according to exemplary embodiments of the inventive concept. FIG. 2A depicts a transmitter operating in closed loop operation mode MODE1 while FIG. 2B depicts a transmitter operating in open loop operation mode2.

Referring to FIGS. 2A and 2B, each transmitter may include a driving power voltage generator 100, an output driver 120, and an operation mode controller 50.

The configurations of FIGS. 2A and 2B may be substantially the same as the configuration depicted in FIG. 1 except for the operation mode controller 50. However, the NMOS transistor N1 may execute a closed loop operation mode at a constant period or at a periodically set constant period at power-on. The NMOS transistor N1 may execute an open loop operation mode at a period other than the constant period.

The operation mode controller 50 may be connected with the driving power voltage generator 100. The operation mode controller 50 may control the driving power voltage generator 100 so as to operate in a closed loop mode during a calibration operation, as depicted by the dashed arrows CIA, CL2 in FIG. 2A, and to operate in an open loop mode during an operation other than calibration, as depicted by the crossed-out dashed arrows CL1, CL2 in FIG. 2B.

Figure 3:
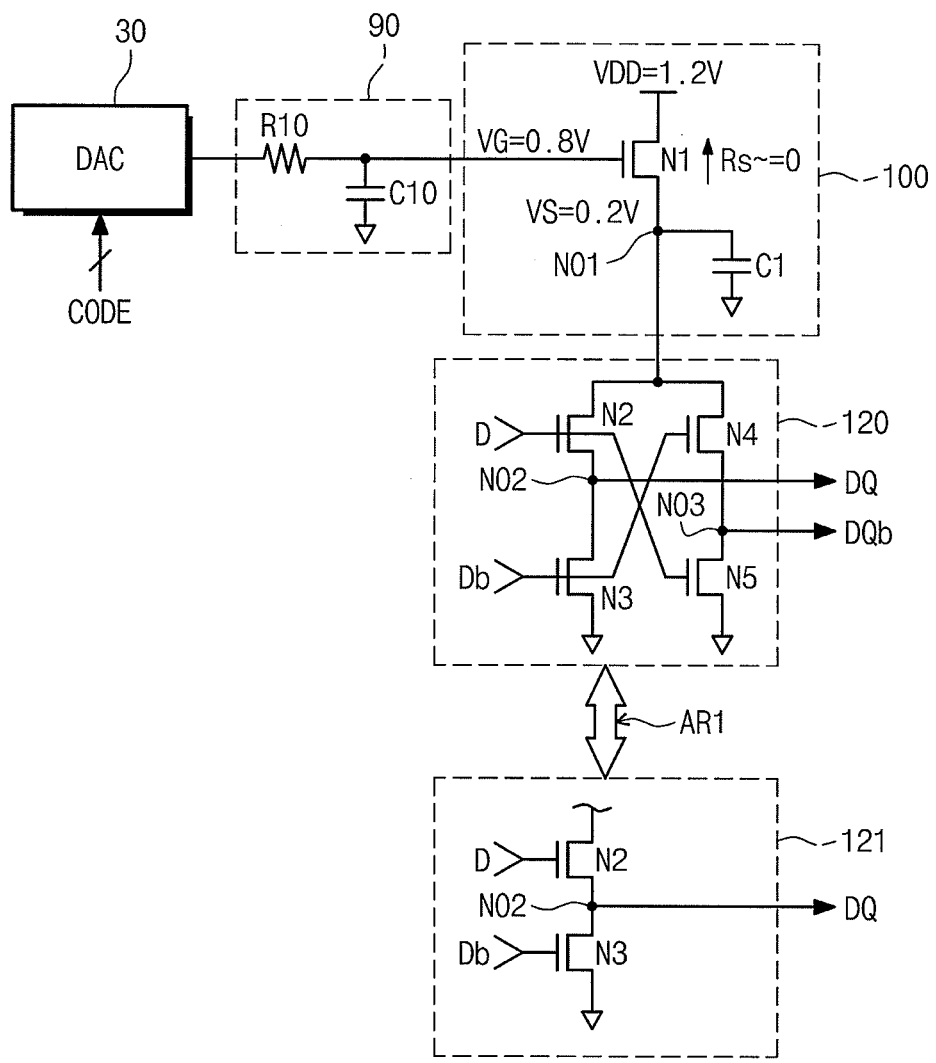
FIG. 3 is a block diagram illustrating the transmitter of FIGS. 2A and 2B according to an exemplary embodiment of the inventive concept.

The operation mode controller 50 may include a first control unit 30 connected with a gate of the NMOS transistor N1 to generate a gate voltage VG applied to the gate of the NMOS transistor N1 in response to a digital code CODE. The digital code CODE may be generated by calibrating the output driving voltage VS during the calibration mode, as depicted by dashed arrow line CL1. In an exemplary embodiment, the first control unit 30 may be a digital-to-analog converter DAC controlled by the digital code CODE as shown in FIG. 3.

The operation mode controller 50 may include a second control unit 40 connected between a drain of the NMOS transistor N1 and a first power supply terminal, for example, a VDD supply terminal to control the driving strength of the NMOS transistor N1 in response to a digital code ON<0:N>. The digital code ON<0:N> may be generated by calibrating the output driving voltage VS during the calibration mode, as depicted by dashed arrow line CL2 in FIG. 2A.

In an exemplary embodiment, the second control unit 40 may include a plurality of MOS transistors P1, . . . Pn each turned on/off according to corresponding logic states of the digital code ON<0:N>.

The first control unit 30 may be configured to control the gate voltage VG of the NMOS transistor N1 used as a regulating element during the calibration mode. Further, the second control unit 40 may be configured to control the driving strength of the NMOS transistor N1 during the calibration mode.

Herein, the calibration mode may be executed after power-on or at a period repeated constantly. Consequently, execution of a closed loop operation mode means execution of the calibration mode.

Since an output driving voltage of the transmitter in FIGS. 2A and 2B is adjusted during a constant period as compared with that in FIG. 1, the transmitter in FIGS. 2A and 2B may further provide better operational performance together with benefits provided by the transmitter in FIG. 1.

Figure 4:
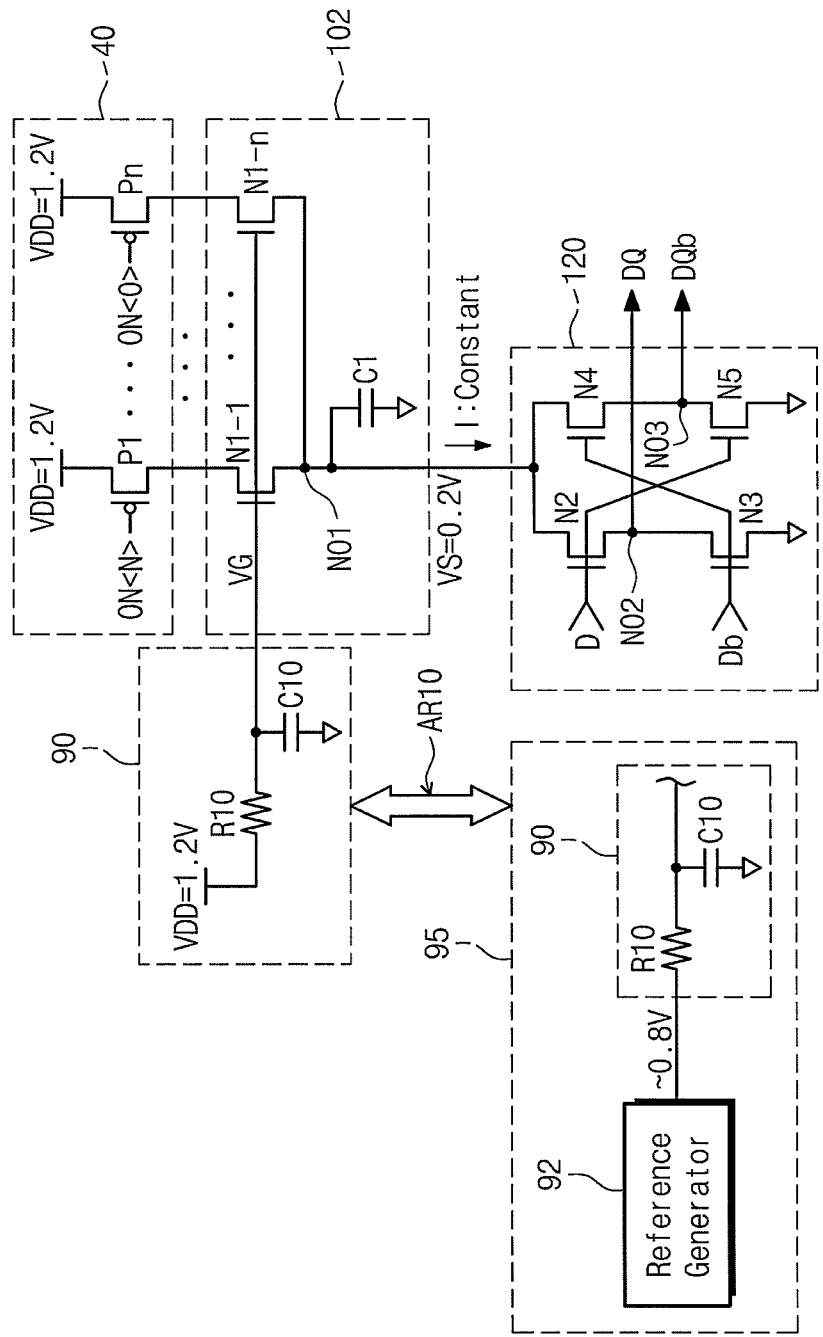
FIG. 4 is a block diagram illustrating the transmitter of FIGS. 2A and 2B according to an exemplary embodiment of the inventive concept.

FIGS. 3 and 4 are block diagrams illustrating exemplary embodiments of the transmitter in FIGS. 2A and 2B.

Referring to FIG. 3, a gate of an NMOS transistor N1 of a driving power voltage generator 100 may be connected with a digital-to-analog converter (DAC) 30 via an integral filter 90 functioning as a low pass filter. The DAC 30 may be controlled by a digital code CODE to function as a first control unit. The digital code CODE may be obtained by calibrating an output driving voltage VS, and may be formed of a plurality of bits. The integral filter 90 may be formed of a resistor R10 and a capacitor C10 to remove power noise.

A capacitor C1 connected between a source of the NMOS transistor N1 and a ground may filter high frequency noise.

An output driver 120 may receive the output driving voltage VS as a driving voltage of about 0.2V for the low swing differential signaling. The output driver 120 may include cross-coupled NMOS transistors N2, N3, N4, N5 to transfer data D, Db input to input terminals to output terminals DQ, DQb, respectively. When data D to be transferred is logically high, the output terminal DQ may output a logical high level, and the complementary output terminal DQb may output a logical low level.

In case of the single signaling, as represented by a substitution arrow AR1 depicting replacing output driver 120 with that of output driver 121, an output driver 121 for the single signaling can be used as the output driver. The output driver 121 may include an NMOS transistor N2 having a source connected with an output node NO2 and an NMOS transistor N3 having a drain-source channel connected between the output node NO2 and a ground.

Since the transmitter in FIG. 3 may have the first control unit 30 in FIGS. 2A and 2B as a DAC component, an output driving voltage may be adjusted during a constant period. Accordingly, in addition to the merits of the transmitter in FIG. 1, the operating performance may be improved Referring to FIG. 4, the second control unit 40 in FIG. 2 may be formed of a plurality of MOS transistors P1, ... Pn which are turned on/off according to logic states of the digital code ON<0:N>, respectively. The PMOS transistor P1 may be turned on when the digital code ON<N> is logically low and turned off when the digital code ON<N> is logically high. Likewise, the PMOS transistor Pn may be turned on when the digital code ON<0> is logically low and turned off when the digital code ON<0> is logically high. In the event that the PMOS transistor P1 is turned on, a first sub-driving transistor N1-1 constituting a part of a plurality of the NMOS transistors N1-1, ... N1-n of the driving power voltage generator 100 may participate in a driving operation. If the PMOS transistor P1 is turned off, the first sub-driving transistor N1-1 does not participate in the driving operation. This means that the driving strength of the NMOS transistors N1-1, ... N1-n is reduced.

Accordingly, it is possible to control the current driving strength of the plurality of NMOS transistors N1-1, ... N1-n by controlling the plurality of MOS transistors P1, ... Pn within the second control unit 40. A first control unit 30 shown in FIGS. 2A and 2B is not illustrated in FIG. 4. A DAC 30 may be provided when the necessity arises. That is, a gate voltage of the NMOS transistors N1-1, ... N1-n in FIG. 4 may be constantly maintained, not adjusted. For this, a voltage of a VDD supply terminal may be supplied as a gate voltage VG via an integral filter 90. Further, a supply of a gate voltage may be accomplished by providing a voltage of a constant voltage supplier 95, as represented by a substitution arrow AR10 depicting replacing integral filter 90 with constant voltage supplier 95. That is, in the event that a voltage of about 0.8V generated from a reference voltage generator 92 is applied to a gate of the NMOS transistors N1-1, ... N1-n via the integral filter 90, it is possible to lower a gate-source voltage Vgs of the NMOS transistors N1-1, ... N1-n. This means that a ripple of the output driving voltage VS according to a variation of a load current becomes lower.

Figure 5:
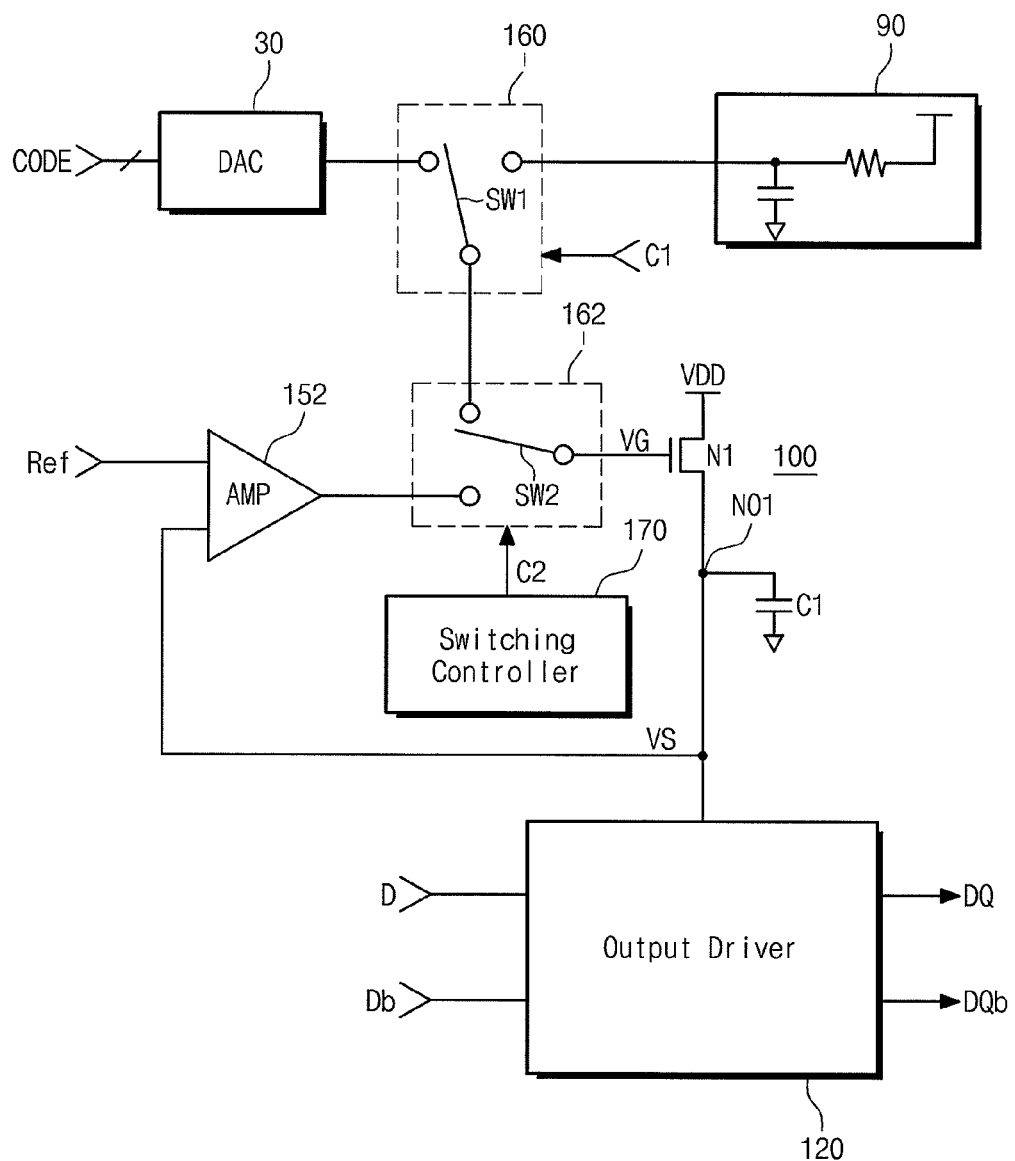
FIG. 5 is a block diagram illustrating a transmitter according to an exemplary embodiment of the inventive concept.

FIG. 5 is a block diagram illustrating a transmitter according to an exemplary embodiment of the inventive concept.

Referring to FIG. 5, the transmitter in FIG. 5 may further include a first switch 160, a second switch 162, and a switching controller 170 as compared with the transmitter in FIG. 3. When the switching controller 170 controls the second switch 162 to be switched to an output terminal of an amplifier 152, a gate voltage VG of the an NMOS transistor N1 may have an output provided from an output terminal of the amplifier 152. In the event that coarse calibration is needed for rapid stabilization during a calibration operation, the switching controller 170 may control the second switch 162 such that the amplifier 152 participates in a closed loop operation of the driving power voltage generator 100. The second switch 162 may be switched in response to a switching control signal C2.

In the event that fine calibration is needed, the switching controller 170 may control the first and second switches 160, 162 such that an output voltage of the DAC 30 is provided as the gate voltage VG of the NMOS transistor N1.

If a calibration operation is ended, a VDD level may be applied as the gate voltage VG via the integral filter 90 to execute an open loop operation mode in which maximum power is saved. At the calibration operation, a closed loop operation may be executed periodically or during a constant period after power-on. That is, the first switch 160 may be switched into an output of the integral filter 90, and the second switch 162 may be switched into a switching output terminal of the second switch 160. The switching controller 170 can be connected with a power-on detector or a counter within a system, and may generate the first and second switching control signals C1, C2 to control the closed and open loop operations.

In case of FIG. 5, the driving power voltage generator may operate in closed loop or open loop, and the coarse calibration or the fine calibration may be realized selectively as the occasion arises.

Figure 6:
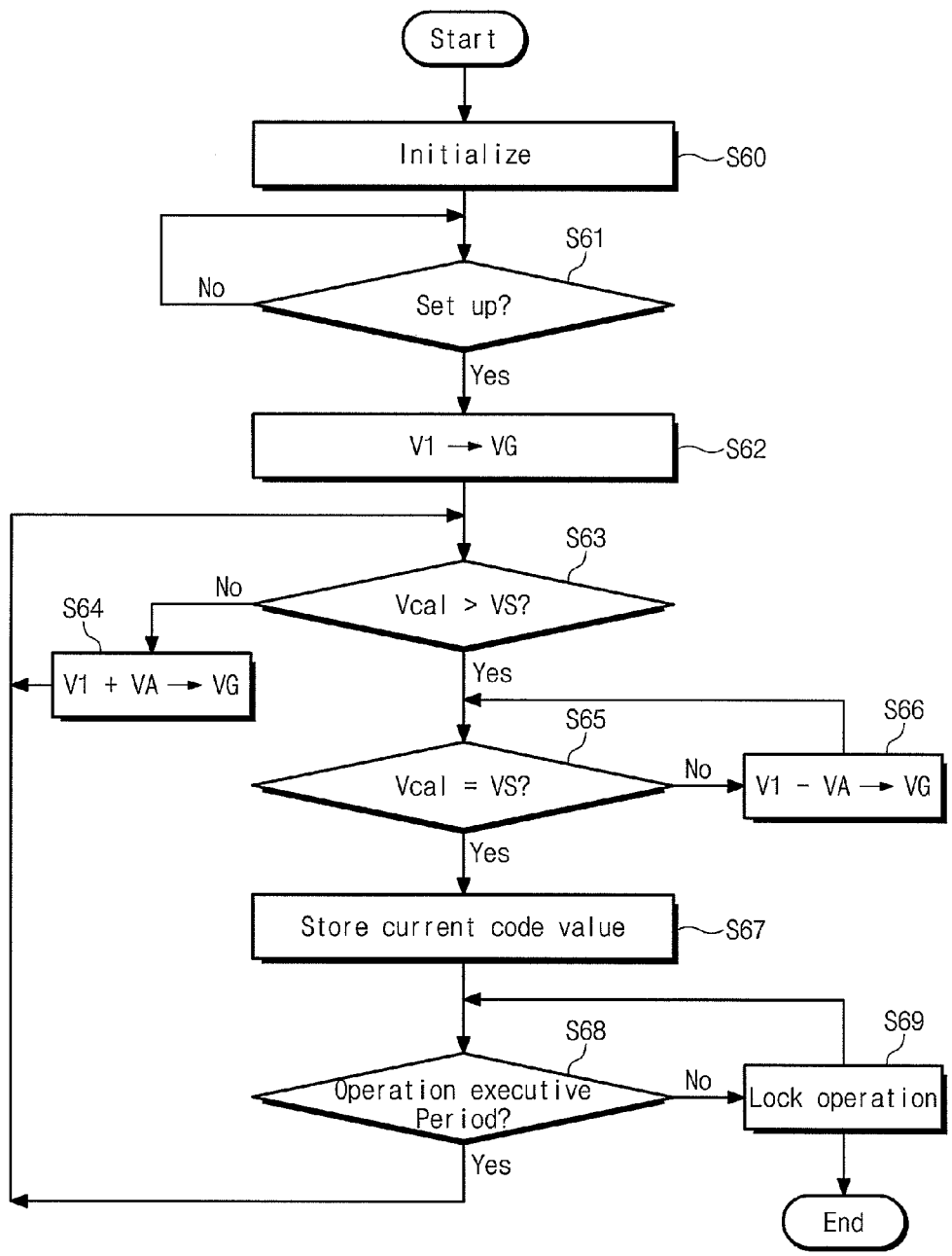
FIG. 6 is a flowchart describing an output driving voltage control method according to an exemplary embodiment of the inventive concept.

FIG. 6 is a flowchart for describing an output driving voltage control method according to an exemplary embodiment of the inventive concept as implemented by the transmitter depicted in FIG. 3.

Referring to FIG. 6, in step S60, an initialization operation may be performed. In step S61, a setup operation can be checked. In an exemplary embodiment, the setup operation is a calibration operation.

At the setup operation mode, the method proceeds to step S62, in which a gate voltage VG may be applied to a gate of the NMOS transistor N1 in FIG. 3 as a second voltage. In this case, an initial applying voltage V1 may be provided as the second voltage. The initial applying voltage V1 may be generated dependent upon the operation of the DAC 30 which generates an analog voltage in response to an initial code value CODE.

If a source voltage of the NMOS transistor N1 is calibrated at a node N01, in step S63, a judgment is made as to whether the calibrated voltage Vcal is higher in level than a reference source voltage VS.

If the calibrated voltage Vcal is lower in level than the reference source voltage VS, the method proceeds to step S64 to increase a gate voltage. In step S64, the gate voltage VG may be set to a voltage of (V1+VA). VA may indicate an increment. If the gate voltage VG is set to have a higher voltage level, the NMOS transistor N1 may be turned on strongly, so that a level of the calibrated voltage Vcal increases.

If the calibrated voltage Vcal is higher than the reference source voltage VS, the method proceeds to step S65, a judgment is made as to whether the calibrated voltage Veal is the same as the reference source voltage VS.

If the calibrated voltage Vcal is not the same as the reference source voltage VS, the method proceeds to step S66 to lower the gate voltage VG. In step S66, the gate voltage VG may be set to a voltage of (V1−VA).

In the event that the calibrated voltage Vcal is judged to be identical to the reference source voltage VS, the method proceeds to step S67, in which a current code value is stored. Since the current code value is stored, calibration is not performed during an operation. An operation mode may transition to an open loop operation.

In step S68, a judgment is made as to whether there is an operation executive period. If so, the method proceeds to step S63. If not, the method proceeds to step S69, in which an operation is locked for an open loop operation.

Figure 7:
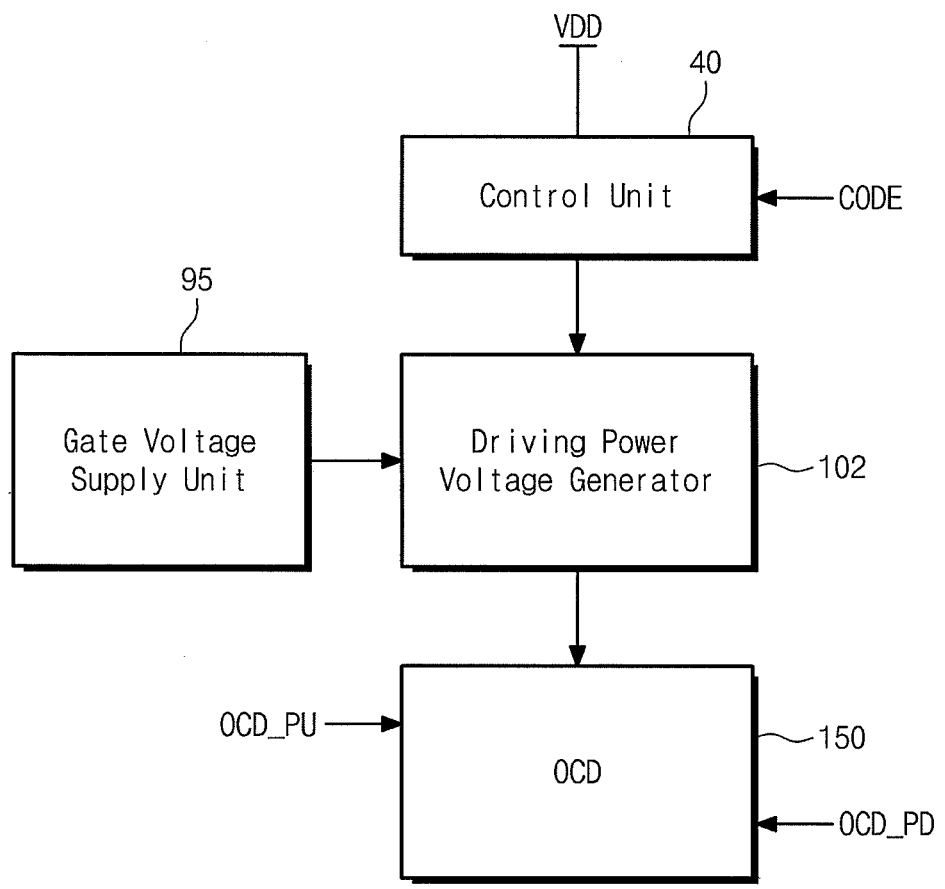
FIG. 7 is a block diagram illustrating a driving circuit according to an exemplary embodiment of the inventive concept.
Figure 8:
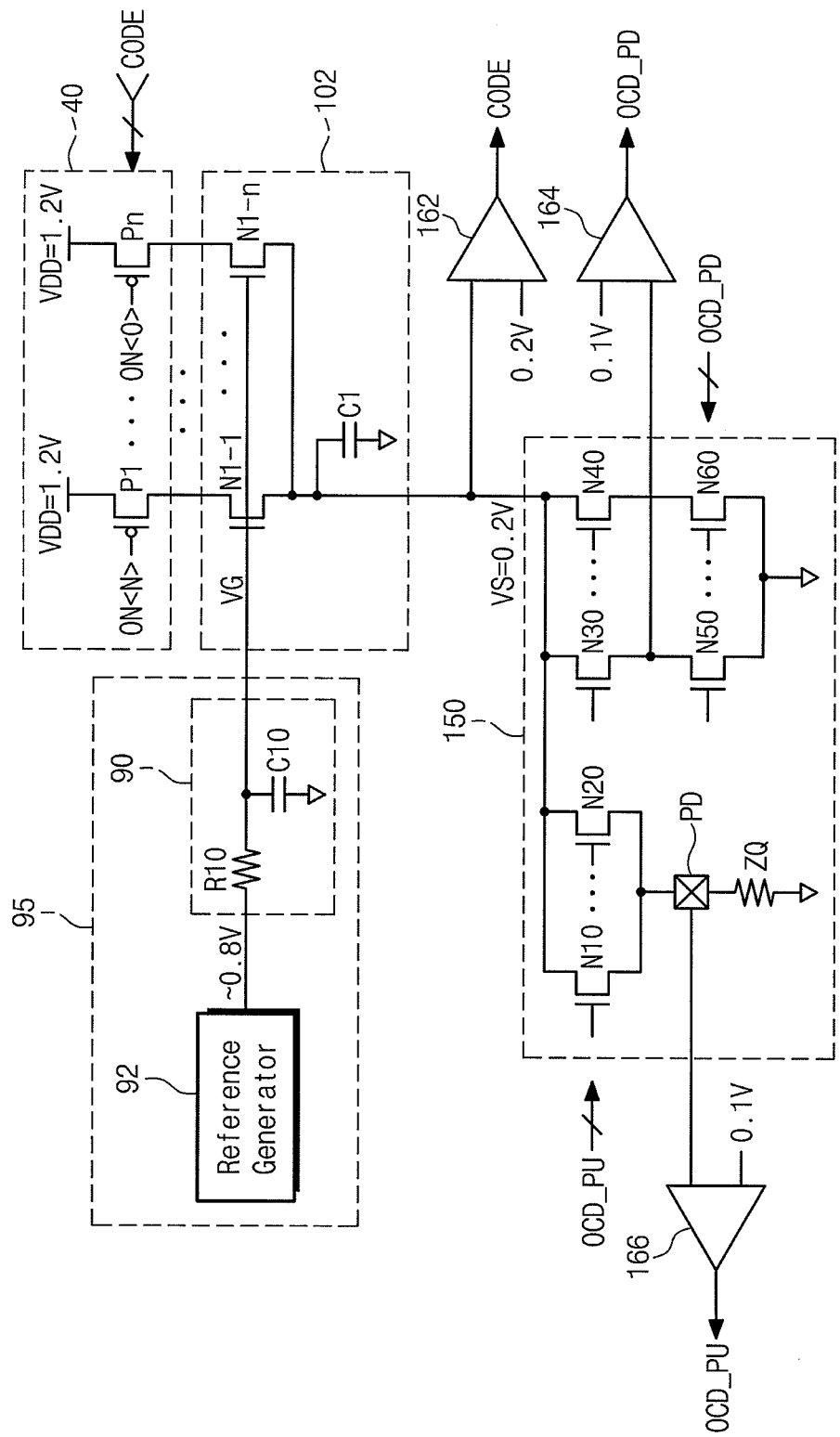
FIG. 8 is a circuit diagram illustrating the driving circuit in FIG. 7 according to an exemplary embodiment of the inventive concept.

FIG. 7 is a block diagram illustrating a driving circuit according to an exemplary embodiment of the inventive concept, and FIG. 8 is a circuit diagram illustrating a driving circuit of FIG. 7 according to an exemplary embodiment of the inventive concept.

Referring to FIGS. 7 and 8, a driving circuit may include a driving power voltage generator 102, an off-chip driver 150, a control unit 40, and a gate voltage supply unit 95.

The driving power voltage generator 102 may include one or more NMOS transistors N1-1, . . . N1-*n* each having a drain connected with a first voltage, for example, a VDD supply terminal, a gate connected to receive a second voltage lower in level than a voltage of the VDD supply terminal, and a source outputting an output driving voltage, as illustrated in FIG. 8. The driving power voltage generator 102 may perform source follower voltage regulating.

The off-chip driver 150 may use an output driving voltage VS as a driving power, and may include pull-up and pull-down driver arrays N10, . . . N20 and N30, . . . N60.

The control unit 40 may function as an operation mode controller, and may be connected with the driving power voltage generator 102. The control unit 40 may control the driving power voltage generator 102 and the off-chip driver 150 so as to operate in a closed loop during a calibration mode and so as to operate in an open loop during a period other than the calibration mode.

The gate voltage supply unit 95 may apply a gate voltage to the gates of NMOS transistors N1-1, . . . N1-*n*, and may include a reference voltage generator 92 configured to generate a reference voltage lower in level than a voltage of the VDD supply terminal, and a filter 90 connected between the reference voltage generator 92 and the gates of the NMOS transistors N1-1, . . . N1-*n* and configured to filter noise of the reference voltage.

In FIG. 8, PMOS transistors P1, . . . Pn of the control unit 40 may be turned on/off according to logical states of a digital code ON<0:N>, respectively. For example, the PMOS transistor P1 may be turned on when the digital code ON<N> is logically high. The PMOS transistor P1 may be turned off when the digital code ON<N> is logically low. The digital code ON<0:N> may be varied at a calibration operation mode, so that the output driving voltage VS is calibrated. Since a driving strength of the NMOS transistors N1-1, . . . N1-*n* is varied according to the variation of the digital code ON<0:N> at the closed loop operation mode, the output driving voltage VS may be matched with a target voltage, for example, 0.2V.

A calibration operation of the output driving voltage VS may be made together with a calibration operation of the off-chip driver 150 or independently from that of the off-chip driver 150. For example, the driving power voltage generator 102 and the off-chip driver 150 may operate together in a closed loop at the calibration mode and in an open loop at a mode other than the calibration mode.

The pull-up and pull-down transistor arrays N10, . . . N20, N30, . . . N60 may be turned on/off according to pull-up and pull-down codes OCD_PU, OCD_PD for impedance matching with an impedance (e.g., 50Ω) of a resistor ZQ connected with a pad PD at a calibration operation. Code generators 162, 166, 164 may generate the digital code CODE, the pull-up code OCD_PU, and the pull-down code OCD_PD, respectively.

The driving power voltage generator 102 within the driving circuit in FIG. 8 may function as a regulator which supplies a power needed for a driving operation of the off-chip driver 150.

In FIG. 8, the gate voltages of NMOS transistors N1=1, . . . N1-*n* may be maintained at a constant voltage. For this, a voltage of about 0.8V generated from the reference voltage generator 92 may be applied to the gates of the NMOS transistors N1-1, . . . N1-*n* through the integral filter 90. A ripple of the output driving voltage VS according to the variation of a load current may be reduced by lowering a gate-source voltage Vgs of the NMOS transistors N1-1, . . . N1-*n*.

Figure 9:
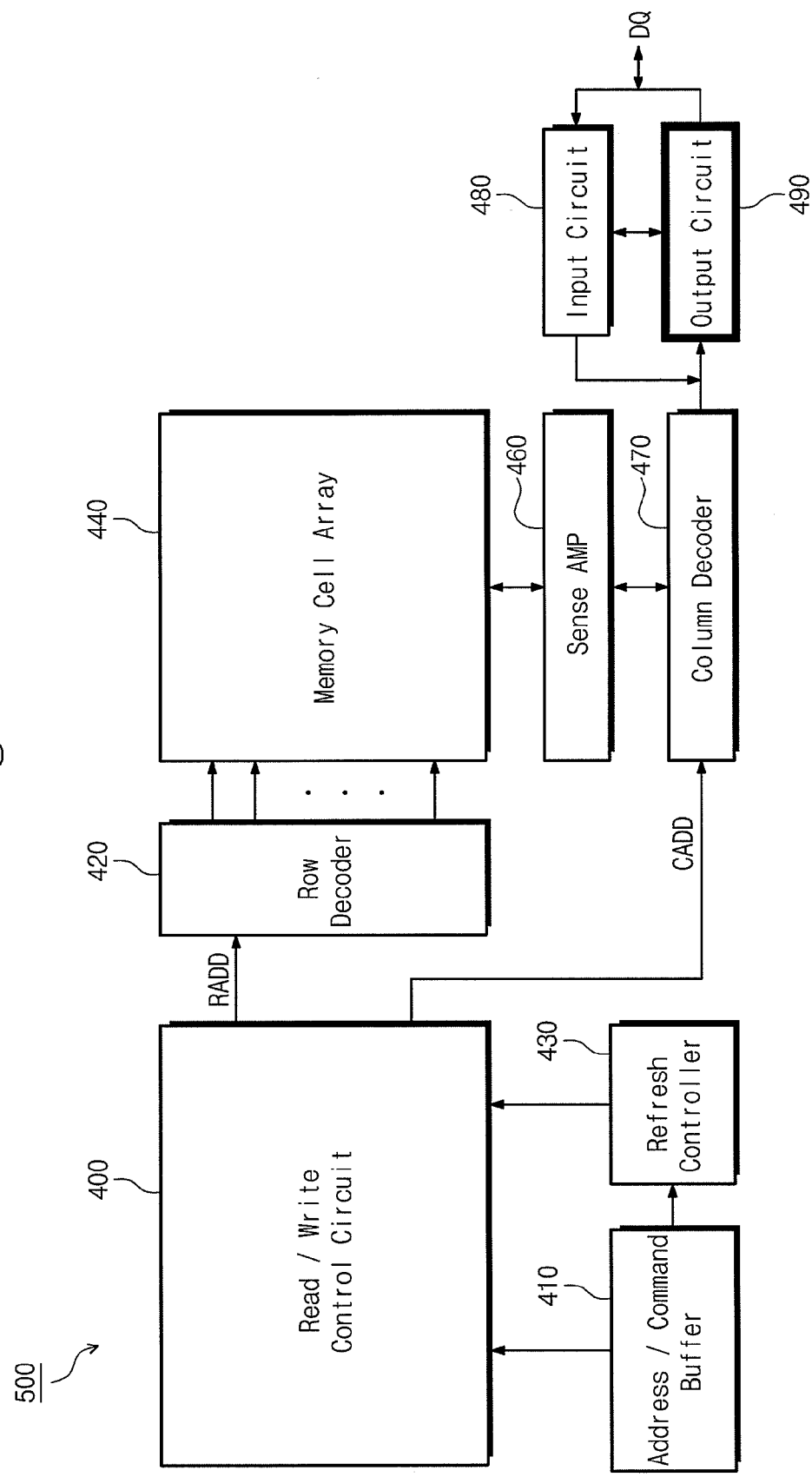
FIG. 9 is a block diagram illustrating a semiconductor memory device including a transmitter in accordance with an exemplary embodiment of the inventive concept.

FIG. 9 is a block diagram illustrating a semiconductor memory device including a transmitter according to an exemplary embodiment of the inventive concept.

Referring to FIG. 9, a semiconductor memory device 500 may include an address/command buffer 410, a refresh controller 430, a read/write control circuit 400, a row decoder 420, a column decoder 470, a memory cell array 440, a sense amplifier 460, an input circuit 480, and an output circuit 490.

The address/command buffer 410 may receive and buffer an external address signal, a bank address signal, and a command. Herein, the command may include a chip select signal /CS, a row address strobe signal /RAS, a column address strobe signal /CAS, and a write enable signal /WE. The command can be applied to the read/write control circuit 400 to be decoded.

The memory cell array 440 may include a plurality of memory cells MC arranged at intersections of a plurality of word lines WL and a plurality of bit lines BL. Each memory cell MC may be a volatile memory cell which is formed of an access transistor and a storage capacitor.

The refresh controller 430 may be connected with the address/command buffer 410, and may generate a refresh control signal for a refresh operation.

The read/write control circuit 400 may control a read operation of reading data from memory cells MC in the memory cell array 440 and a write operation of writing data therein. The read/write control circuit 400 may multiplex the external address signal according to the command to generate a row address RADD and a column address CADD. Further, the read/write control circuit 400 may control a refresh operation of memory cells to be refreshed in response to the refresh control signal.

The read/write control circuit 400 may receive a clock enable signal CKE and a clock signal CLK buffered by a clock buffer (not shown) for providing a clock signal.

The row decoder 420 may decode the row address RADD to select a row of the memory cell array 440.

The column decoder 470 may decode the column address CADD to select a column of the memory cell array 440.

The sense amplifier 460 may sense amplify a voltage developed at a bit line to provide an external device with data stored in a selected memory cell MC of the memory cell array 440.

The input circuit 480 may receive data to be stored in a memory cell, and the output circuit 490 may output cell data provided from the sense amplifier 460 via an input/output terminal DQ.

If the semiconductor memory device 500 is a high-speed DRAM transferring data in a low swing differential signaling manner, a transmitter according to exemplary embodiments of the inventive concept shown in FIGS. 1, 2, and 5 may be implemented as the output circuit 490. Accordingly, a data transfer efficiency of the semiconductor memory device may be improved, and power consumption may be minimized or reduced.

Figure 10:
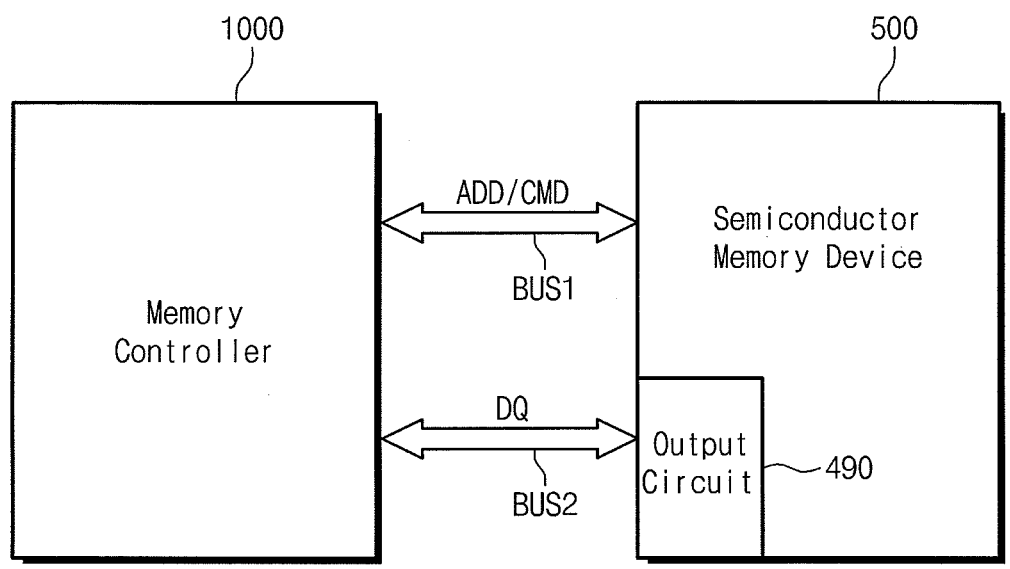
FIG. 10 is a block diagram illustrating a data processing device including a transmitter in accordance with an exemplary embodiment of the inventive concept.

FIG. 10 is a block diagram illustrating a data processing device including a transmitter according to an exemplary embodiment of the inventive concept.

Referring to FIG. 10, a data processing device may include a memory controller 1000 and a semiconductor memory device 500. The memory controller 1000 and the semiconductor memory device 500 may be connected via a first bus BUS1 and a second bus BUS2. Herein, the first bus BUS1 may be a bus for sending an address and a command, and the second bus BUS2 may be a bus for sending data. A transmitter according to exemplary embodiments of the inventive concept shown in FIGS. 1, 2, and 5 may be implemented as an output circuit 490 of the semiconductor memory device. Accordingly, the overall operational performance of the data processing device may be improved, and power consumption may be minimized or reduced.

Should the data processing device be a mobile device, it may be one of a cellular phone, a PDA, a digital camera, a portable gate console, and an MP3 player, or a notebook computer. Although not shown in FIG. 10, the mobile device may include a battery that supplies an operating voltage needed for the operation thereof and a power supply device for efficiently using the supplied power. Further, the data processing device may further include an application chipset and a camera image processor (CIS).

In the mobile device, if an NMOS transistor is used as a component for generating the driving power of a transmitter, power consumption of the battery may be minimized or reduced, so that device performance is improved.

FIGS. 11A to 11D are diagrams illustrating various memory bus protocols between a memory controller and a memory according to exemplary embodiments of the inventive concept.

Figure 11:
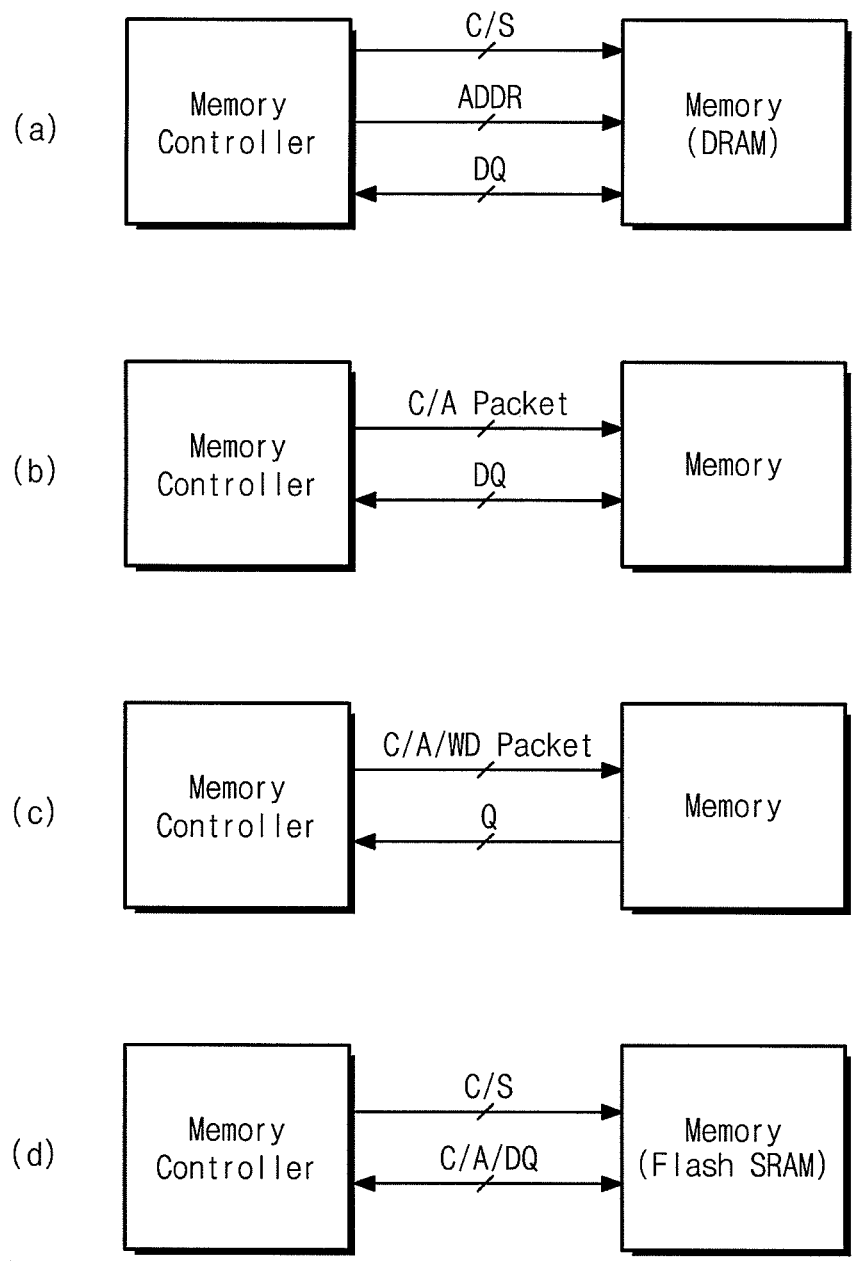
FIGS. 11A, 11B, 11C and 11D are diagrams illustrating various memory bus protocols between a memory controller and a memory according to an exemplary embodiment of the inventive concept.

Referring to FIG. 11A, there is illustrated a bus protocol between a memory controller and a memory (e.g., DRAM). Control signals (e.g., /CS, CKE, /RAS, /CAS, /WE, etc.) and an address signal ADDR may be sent to the memory from the memory controller. Data DQ may be transferred bilaterally.

Referring to FIG. 11B, packetized control signals and address signals C/A Packet may be sent to the memory from the memory controller. Data DQ may be transferred bilaterally.

Referring to FIG. 11C, packetized control signals, address signals, and write signals C/A/WD Packet may be sent to the memory from the memory controller. Data DQ may be transferred in one direction from the memory to the memory controller.

Referring to FIG. 11D, control signals C/S may be provided to the memory (e.g., a flash SRAM) from the memory controller. A command, an address, and data C/A/DQ may be transferred bilaterally.

In the case of FIGS. 11A and 11B, if a memory uses an NMOS transistor as a component for generating the driving power of a transmitter, the device performance may be improved.

Figure 12:
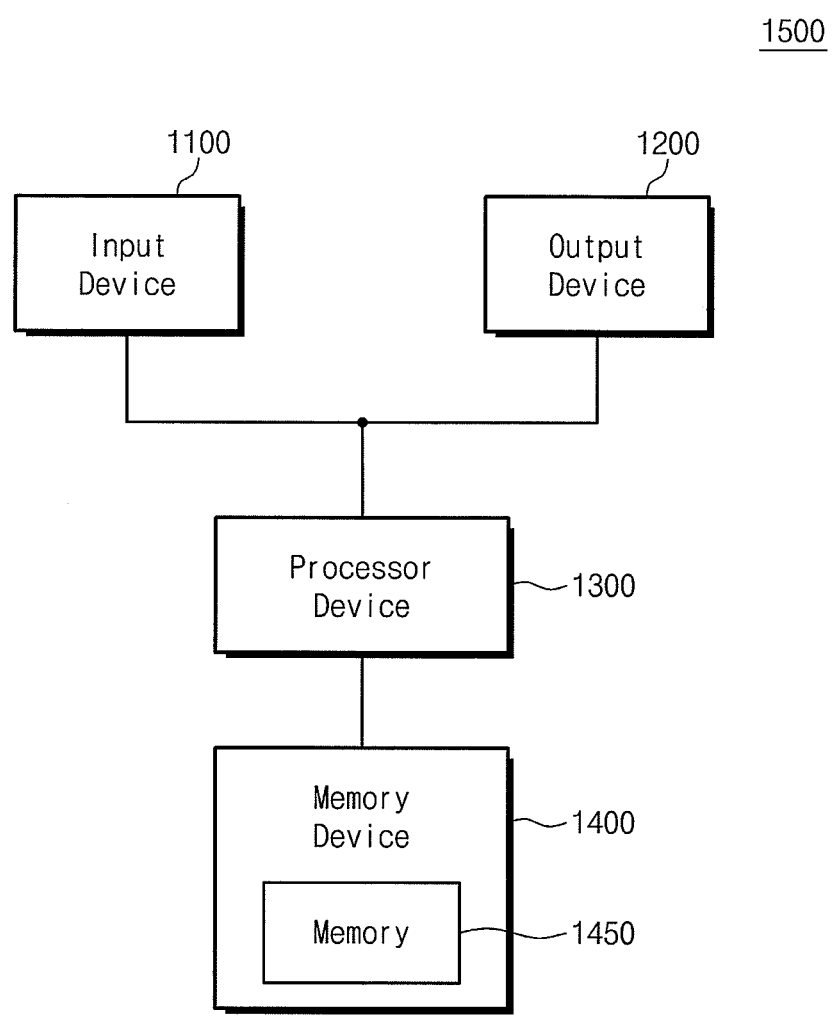
FIG. 12 is a block diagram illustrating an electronic system according to an exemplary embodiment of the inventive concept.

FIG. 12 is a block diagram illustrating an electronic system according to an exemplary embodiment of the inventive concept. Referring to FIG. 12, an electronic system 1500 may include an input device 1100, an output device 1200, a processor device 1300, and a memory device 1400.

The memory device 1400 may include a transmitter according to an exemplary embodiment of the inventive concept. Herein, the memory device 1400 may include a memory 1450 having a typical memory structure or a three-dimensional stack structure. The memory device 1400 may include a memory controller and the memory 1450. A transmitter according to an exemplary embodiment of the inventive concept may be included in the memory 1450. The processor device 1300 may control the input device 1100, the output device 1200, and the memory device 1400 via corresponding interfaces. In the exemplary embodiment depicted in FIG. 12, if the memory 1450 uses an NMOS transistor as a component for generating a driving power of a transmitter, the performance of the electronic system may be improved.

Figure 13:
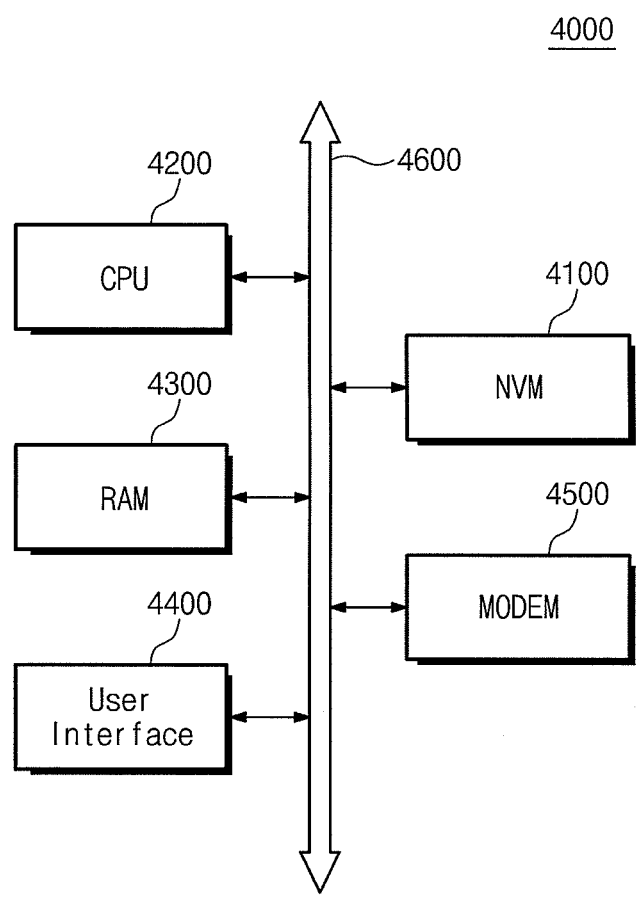
FIG. 13 is a block diagram illustrating a computing system according to an exemplary embodiment of the inventive concept.

FIG. 13 is a block diagram illustrating a computing system according to an exemplary embodiment of the inventive concept. Referring to FIG. 13, a computing system 4000 may include a CPU 4200, a RAM 4300, a user interface 4400, a modem 4500 such as a baseband chipset, and a memory system 4100 which are electrically connected with a system bus 4600.

The memory system 4100 may include at least one nonvolatile memory device using a first high voltage VPP1 and a second high voltage VPP2 provided from boosters generating different high voltages. The second high voltage VPP2 generated from one booster may be used as a source voltage or a driving voltage used to generate the first high voltage VPP1 higher in level than the second high voltage VPP2.

If the computing system 4000 is a mobile device, it may further include a battery (not shown) for supplying an operating voltage of the computing system 4000. Although not shown in FIG. 13, the computing system 4000 may further include an application chipset, a camera image processor (CIP), a mobile DRAM, and the like. The memory system 4100 may be formed of a solid state drive/disk (SSD) using a nonvolatile memory to store data. Further, the memory system 4100 may be formed of a fusion flash memory (e.g., a memory including an SRAM buffer, a NAND flash memory, and NOR interface logic). In case of FIG. 13, a memory uses an NMOS transistor as a component for generating a driving power of a transmitter, a power saving capacity of the computing system 4000 may be improved.

A nonvolatile memory device and/or a controller may be packed by various types of packages such as PoP (Package on Package), Ball grid arrays (BGAs), Chip scale packages (CSPs), Plastic Leaded Chip Carrier (PLCC), Plastic Dual In-Line Package (PDI2P), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), and the like.

As described herein, exemplary embodiments of the inventive concept are directed to provide a transmitter which has an excellent operating performance and consumes a relatively less power. Further, exemplary embodiments of the inventive concept are directed to provide a transmitter capable of minimizing or removing the overhead of a circuit element that generates a gate voltage. Further, the exemplary embodiments of the inventive concept are directed to provide a transmitter having a closed loop operation mode and an open loop operation mode. The exemplary embodiments of the inventive concept are further directed to provide a semiconductor memory device including an improved transmitter and to provide a driving circuit having an excellent operating performance and that consume relatively less power than conventional driving circuits.

According to exemplary embodiments of the inventive concept, since an NMOS transistor is used as an element for generating a driving power of a transmitter or a driving circuit and a gate voltage lower in level than a power supply voltage is used, an operational performance of the transmitter or the driving circuit can be excellent, and the PSRR characteristic can also be better. Further, power consumption may be minimized or reduced by removing or selectively operating an amplifier that supplies a gate voltage to a gate of an NMOS transistor.

The above-disclosed subject matter is to be considered illustrative, and not restrictive, and the appended claims are intended to cover all such modifications, enhancements, and other embodiments thereof.

What is claimed is:

1. A transmitter comprising:
a driving power voltage generator including an NMOS transistor having a drain connected with a first voltage supply terminal, a gate configured to receive a second voltage lower than a voltage of the first voltage supply terminal, and a source configured to output an output driving voltage, the driving power voltage generator configured to perform source follower voltage regulating;
an output driver that uses the output driving voltage as a driving power and is configured to transfer data input at an input terminal of the output driver to an output terminal of the output driver; and
an operation mode controller connected with the driving power voltage generator,
wherein the operation mode controller is configured to control the driving power voltage generator to operate in a closed loop during a calibration mode and in an open loop during an operation mode other than the calibration mode.

2. The transmitter of claim 1, wherein the operation mode controller comprises:
a first control unit configured to generate the second voltage in response to a control code obtained by calibrating the output driving voltage during the calibration mode and to control the gate of the NMOS transistor.

3. The transmitter of claim 2, wherein the first control unit comprises a digital-to-analog converter controlled by a digital code.

4. The transmitter of claim 1, wherein the operation mode controller comprises a second control unit connected between the drain of the NMOS transistor and the first voltage supply terminal, the second control unit configured to control a driving strength of the NMOS transistor in response to a control code obtained by calibrating the output driving voltage during the calibration mode.

5. The transmitter of claim 4, further comprising:
an integral filter connected between the first voltage supply terminal and the gate of the NMOS transistor and configured to filter noise.

6. The transmitter of claim 4, further comprising:
a reference voltage generator configured to generate a reference voltage for supplying the second voltage; and
an integral filter connected between an output of the reference voltage generator and the gate of the NMOS transistor and configured to filter noise.

7. The transmitter of claim 4, wherein the second control unit comprises a plurality of MOS transistors each turned on/off according to logic states of the digital code.

8. The transmitter of claim 3, further comprising:
an amplifier forming a closed loop with respect to the driving power voltage generator and configured to generate the second voltage;
a switch configured to switch one of an output of the amplifier and an output of the digital-to-analog converter into the gate of the NMOS transistor in response to a switching control signal; and
a switching controller configured to generate the switching control signal.

9. The transmitter of claim 8, wherein the switching controller is configured to control the switch during the calibration mode such that fine calibration is made after coarse calibration.

10. The transmitter of claim 8, wherein the amplifier operates in a closed loop during the calibration mode and the driving power voltage generator receives an output of the digital-to-analog converter as the second voltage to operate in an open loop.

11. A voltage regulator comprising:
a driving power voltage generator comprising at least one NMOS transistor, whose drain is connected to a power supply voltage, whose gate is configured to receive a gate voltage, and whose source is configured to output an output driving voltage, and
an operation mode controller connected to the driving power voltage generator and configured to control the driving power voltage generator to operate in a closed loop mode during a calibration operation, and to operate in an open loop mode during an operation other than the calibration operation,
wherein in the closed loop mode a first code or a second code is generated by calibrating the output driving voltage during the calibration operation to provide a gate voltage to the gate of the at least one NMOS transistor in response to the first code or to control the driving strength of the at least one NMOS transistor in response to the second code, and
wherein in the open loop mode the operation mode controller does not receive feedback from the driving power voltage generator.

12. The voltage regulator of claim 11, further comprising an output driver, driven by the output driving voltage, and configured to output input data input received by the output driver.

13. The voltage regulator of claim 11, further comprising an off-chip driver, driven by the output driving voltage, and including a pull-up driver array and a pull-down driver array that receive the output driving voltage.

14. The voltage regulator of claim 11, wherein the operation mode controller comprises:
a first control unit connected to the gate of the at least one NMOS transistor and configured to generate a gate voltage applied to the gate in response to the first code, and/or
a second control unit connected between the drain of the at least one NMOS transistor and the first power supply terminal and configured to control the driving strength of the at least one NMOS transistor in response to the second code.

15. The voltage regulator of claim 14,
wherein the driving power voltage generator comprises a plurality of NMOS transistors whose drains are connected a power supply voltage, whose gates commonly receive the gate voltage, and whose sources output the output driving voltage, and
wherein the second control unit comprises a plurality of PMOS transistors each turned on/off according to corresponding logic states of the second code.

* * * * *